United States Patent
Lambert et al.

(10) Patent No.: US 11,160,157 B2
(45) Date of Patent: Oct. 26, 2021

(54) PLASMA DEVICE CONSUMABLE PART CHANGE DETECTION

(71) Applicant: VICTOR EQUIPMENT COMPANY, Denton, TX (US)

(72) Inventors: Roger H. Lambert, West Lebanon, NH (US); Ryan T. Lynaugh, Cornish, NH (US); David C. Griffin, Florence, SC (US); Andrew J. Raymond, Lebanon, NH (US)

(73) Assignee: VICTOR EQUIPMENT COMPANY, Denton, TX (US)

( * ) Notice: Subject to any disclaimer, the term of this patent is extended or adjusted under 35 U.S.C. 154(b) by 195 days.

(21) Appl. No.: 16/244,483

(22) Filed: Jan. 10, 2019

(65) Prior Publication Data

US 2019/0223282 A1    Jul. 18, 2019

Related U.S. Application Data

(63) Continuation of application No. PCT/US2016/042805, filed on Jul. 18, 2016.

(51) Int. Cl.
*B23K 10/00* (2006.01)
*H05H 1/36* (2006.01)
(Continued)

(52) U.S. Cl.
CPC .............. *H05H 1/36* (2013.01); *B23K 10/00* (2013.01); *B23K 10/02* (2013.01); *H05H 1/34* (2013.01); *B23K 10/006* (2013.01)

(58) Field of Classification Search
CPC ... H05H 1/26; H05H 1/34; H05H 1/36; B23K 10/00; B23K 10/006; B23K 10/02
(Continued)

(56) References Cited

U.S. PATENT DOCUMENTS

| 4,959,520 A | 9/1990 | Okada et al. |
| 5,357,076 A | 10/1994 | Blankenship |

(Continued)

OTHER PUBLICATIONS

Extended European Search Report for European Application No. 16909642.7 dated Mar. 18, 2020, 9 pages.
(Continued)

*Primary Examiner* — Mark H Paschall
(74) *Attorney, Agent, or Firm* — Edell, Shapiro & Finnan, LLC

(57) ABSTRACT

Approaches herein provide a system for determining whether one or more consumable parts of a plasma device has been removed or replaced while the plasma device and associated sensors lie dormant or are no longer receiving data, e.g., when the plasma device is power-off. The approaches herein determine whether certain types of data stored in a controller's memory are still valid, for example, for the purposes of determining degradation and/or end-of-life of the consumable parts. In the case that one or more consumable parts has been serviced or replaced, the data stored in the controller memory may no longer be considered valid for the consumable part(s). In one approach, the controller determines a status of a switch or a conformal film in the device following start-up, and determines, based on the position of the switch or the conformal film, whether the consumable part has been removed or replaced.

17 Claims, 9 Drawing Sheets

(51) Int. Cl.
*H05H 1/34* (2006.01)
*B23K 10/02* (2006.01)

(58) Field of Classification Search
USPC ............ 219/121.39, 121.45, 121.48, 121.54, 219/121.57, 75
See application file for complete search history.

(56) References Cited

U.S. PATENT DOCUMENTS

| | | | |
|---|---|---|---|
| 5,886,315 A | 3/1999 | Lu et al. | |
| 6,563,085 B2 | 5/2003 | Lanouette et al. | |
| 6,707,304 B2 | 3/2004 | Buhler et al. | |
| 6,855,914 B1 | 2/2005 | Kaufman et al. | |
| 7,084,367 B2 | 8/2006 | Sommerfeld et al. | |
| 7,186,944 B2 | 3/2007 | Matus | |
| 7,381,925 B2 | 6/2008 | Decoster et al. | |
| 8,343,305 B2 | 1/2013 | Patrick | |
| 8,907,249 B2 | 12/2014 | Berger et al. | |
| 2004/0167460 A1 | 8/2004 | Anderson et al. | |
| 2006/0006154 A1* | 1/2006 | Koike | H05H 1/36 219/121.5 |
| 2006/0151446 A1 | 7/2006 | Schneider | |
| 2006/0171848 A1 | 8/2006 | Roche et al. | |
| 2009/0057277 A1 | 3/2009 | Renault et al. | |
| 2010/0324470 A1* | 12/2010 | Anderson | A61N 1/0436 604/20 |
| 2015/0332071 A1* | 11/2015 | Hoffa | B23K 26/38 340/10.2 |
| 2015/0343555 A1* | 12/2015 | Gullotta | B23K 10/006 219/121.54 |
| 2016/0336149 A1* | 11/2016 | Larsson | H01J 37/32651 |

OTHER PUBLICATIONS

Office Action for Chinese Application for Invention No. 201680087766.5 dated Apr. 3, 2020, 5 pages.

Notification of Transmittal of International Search Report and Written Opinion including International Search Report and Written Opinion of International Application PCT/US2016/042805 dated Nov. 15, 2016, 14 pages.

Examination Report No. 1 for Australian Patent Application No. 2016415829 dated Jun. 28, 2019, 4 pages.

* cited by examiner

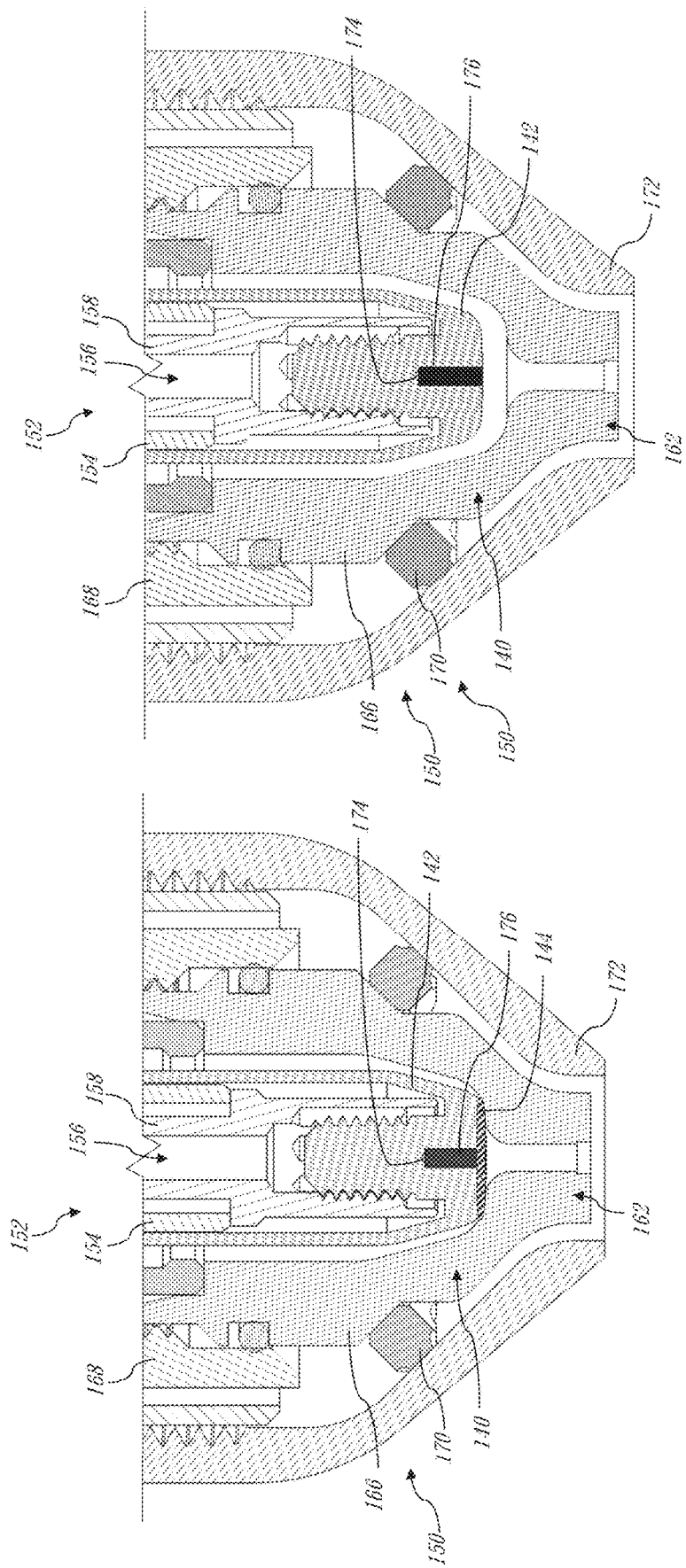

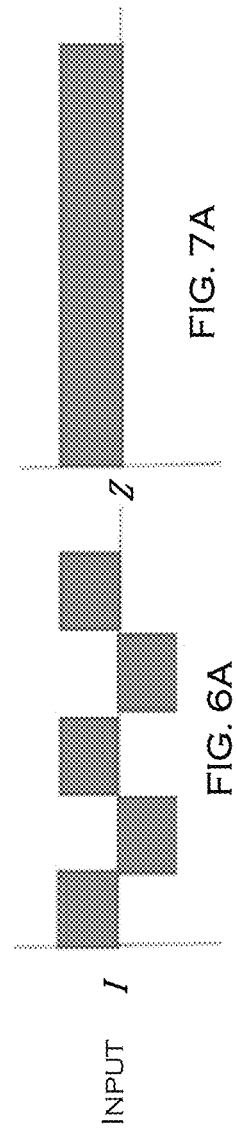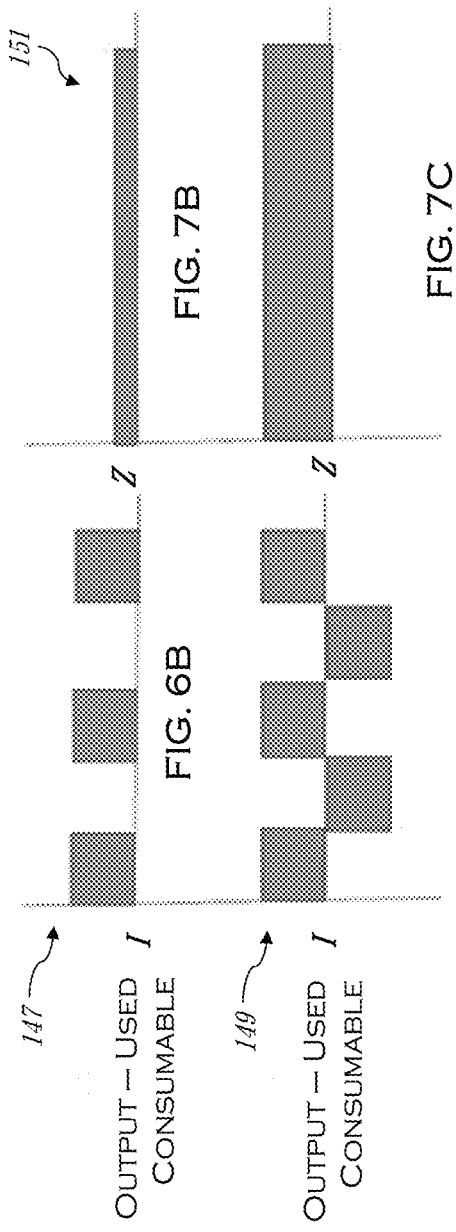

PLASMA DEVICE CONSUMABLE PART CHANGE DETECTION

CROSS-REFERENCE TO RELATED APPLICATIONS

This application is a continuation of International Application No. PCT/US2016/042805, filed on Jul. 18, 2016, the entire contents of which is hereby incorporated by reference.

BACKGROUND OF THE DISCLOSURE

Field of the Disclosure

The present disclosure relates generally to machine tools and, more particularly, to devices and methods for detecting replacement of a consumable part of a plasma device.

Discussion of Related Art

Plasma devices, such as plasma arc torches, may be used for cutting, marking, gouging, and welding metal workpieces by directing a high energy plasma stream consisting of ionized gas particles toward the workpiece. In a typical plasma arc torch, the gas to be ionized is supplied to a distal end of the torch and flows past an electrode before exiting through an orifice in the tip, or nozzle, of the plasma arc torch. The electrode has a relatively negative potential and operates as a cathode. Conversely, the torch tip has a relatively positive potential and operates as an anode. Further, the electrode is in a spaced relationship with the tip, thereby creating a gap, at the distal end of the torch. In operation, a pilot arc is created in the gap between the electrode and the tip, which heats and subsequently ionizes the gas. Ionized gas is then blown out of the torch and appears as a plasma stream that extends distally off the tip. As the distal end of the torch is moved to a position close to the workpiece, the arc jumps or transfers from the torch tip to the workpiece because the impedance of the workpiece to ground is lower than the impedance of the torch tip to ground. Accordingly, the workpiece serves as the anode, and the plasma arc torch is operated in a "transferred arc" mode.

The high heat and electrical arc often damage the consumable components of the torch, such as electrodes, tips, nozzles, liners, rollers and wire guides, etc., and, as a result, these components must be periodically replaced. In an effort to appropriately predict consumable part replacement, analytics of portable cutters and welders count and record arc-hours in nonvolatile memory. The arc-hour value may be aggregated as an indicator of overall wear on the system. Most machines control the process during a single cut or weld, often displaying the average current or voltage at termination, yet retaining no information to improve or guide subsequent operation. As a result, analytics of conventional systems may only infer consumable replacement, for example, when an operator selects a new cut process that typically requires alternate components.

SUMMARY OF THE DISCLOSURE

In view of the foregoing, provided herein are approaches for employing historical data to adjust cut or weld parameters based on trends detected during earlier operation, and/or to prompt an operator to service equipment before substandard performance compromises the work. The data may be used as part of a system in which patterns, anomalies, and trends of a plasma torch could be relayed to operators or technical service representatives for fault diagnosis or to signal the need for preventive maintenance. Outputs or warnings may be issued before consumable degradation compromises the work piece, or other cutter and welder components.

In exemplary approaches, this is achieved by detecting consumable part changes, e.g., when the welding or cutting system is deenergized, as the electrical circuits are inactive and thus cannot detect changes to parts-in-place or any other monitored conditions that would indicate that the machine should disregard, bundle, or reset data collection.

In one approach, an apparatus includes a conformal film disposed on a consumable of a plasma device, and a controller in communication with the consumable and the conformal film. In some approaches, the controller is operable to associate a first set of performance data with the consumable part, determine a condition of the conformal film following start-up of the plasma device, determine, based on the condition of the conformal film, whether the consumable part is present within the plasma device following start-up of the plasma device, and associate a second set of performance data with the consumable part in the case that the consumable part is determined to be present within the plasma device following start-up of the plasma device.

In another approach, a method includes providing a torch head disposed at a proximal end of a plasma arc torch, the torch head including a consumable part, and providing a conformal film on the consumable part. The method further includes applying an electrical current to the consumable part following a start-up of the plasma arc torch, receiving an electrical impedance of the conformal film in response to the electrical current, and determining, following the start-up of the plasma arc torch, whether the consumable part is present within the torch head by comparing the electrical impedance of the conformal film to a reference conformal film impedance value.

In yet another approach a plasma arc torch includes a torch head disposed at a proximal end of the plasma arc torch, a conformal film disposed on an electrode within the torch head, and a controller for receiving a measurement from the conformal film. In some embodiments, the controller determines, based on the measurement from the conformal film, whether the electrode was used in a previous power cycle prior to a shutdown of the plasma arc torch.

BRIEF DESCRIPTION OF THE DRAWINGS

The accompanying drawings illustrate exemplary approaches for detecting consumable part changes, and in which:

FIGS. 5A-B are cross sectional views of a plasma arc torch according to an exemplary approach;

FIGS. 6A-C are graphical representations of a current through a diode film according to an exemplary approach;

FIGS. 7A-C are graphical representations of an impedance corresponding to a resistive film according to an exemplary approach;

Figure 1:
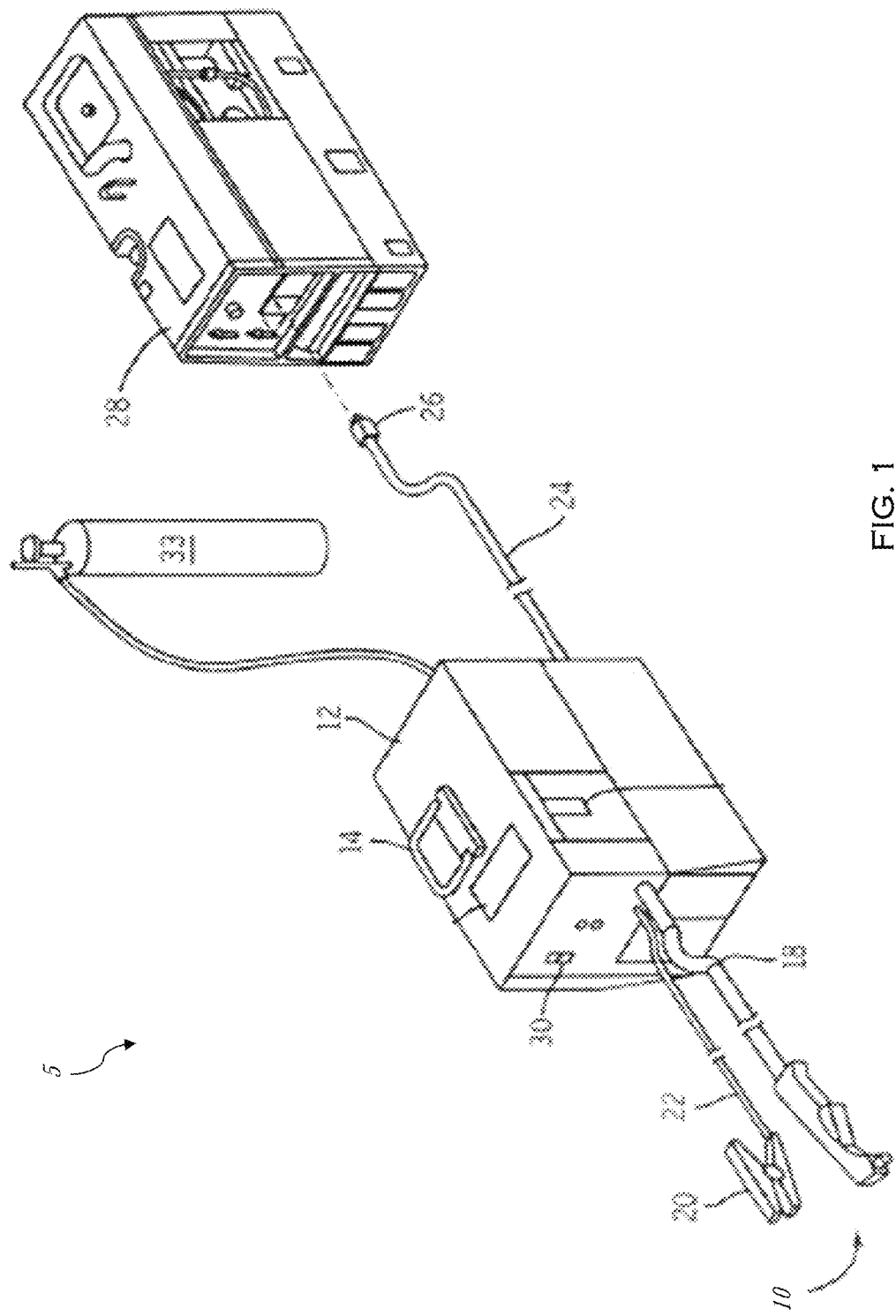
FIG. 1 is an isometric view of a system according to an exemplary approach.

The drawings are not necessarily to scale. The drawings are merely representations, not intended to portray specific parameters of the disclosure. The drawings are intended to depict exemplary embodiments of the disclosure, and therefore are not be considered as limiting in scope. In the drawings, like numbering represents like elements.

DESCRIPTION OF EMBODIMENTS

The present disclosure will now proceed with reference to the accompanying drawings, in which various approaches are shown. It will be appreciated, however, that the disclosed torch handle may be embodied in many different forms and should not be construed as limited to the approaches set forth herein. Rather, these approaches are provided so that this disclosure will be thorough and complete, and will fully convey the scope of the disclosure to those skilled in the art. In the drawings, like numbers refer to like elements throughout.

As used herein, an element or operation recited in the singular and proceeded with the word "a" or "an" should be understood as not excluding plural elements or operations, unless such exclusion is explicitly recited. Furthermore, references to "one approach" of the present disclosure are not intended to be interpreted as excluding the existence of additional approaches that also incorporate the recited features.

Furthermore, spatially relative terms, such as "beneath," "below," "lower," "central," "above," "upper," "on," "over," and the like, may be used herein for ease of describing one element's relationship to another element(s) as illustrated in the figures. It will be understood that the spatially relative terms may encompass different orientations of the device in use or operation in addition to the orientation depicted in the figures.

As described above, worn consumable parts, such as electrodes, tips, nozzles, liners, rollers and wire guides, contribute greatly to performance degradation, which may be detectable by sensors that measure changes in magnitude, frequency, duration, etc. Cumulative arc time, number of starts, stops and other factors correlated to wear may be used to augment end-of-life detection. Such process durations and counts might also be used alone, without sensor inputs, to estimate when parts may have degraded excessively. This long-term data may be stored by a controller, where it may be used directly, or transmitted to a remote computer for quality control. The information may be useful, for example, to assess the techniques of individual workers or to determine when consumable wear may cause imminent failure.

To further augment consumable end-of-life detection, the present disclosure employs an indicator, such as an EMI or a conformal film, that signals whether or not a consumable part may have been removed (e.g., for servicing) or replaced. This may be particularly advantageous while the plasma arc torch and associated sensors lie dormant or are no longer receiving data, e.g., when the device is powered-off.

The approaches described herein determine whether certain types of data stored in a controller's memory are still valid, for example, for the purposes of determining end of life of the consumable parts. In the case that it is determined that one or more consumable parts has been serviced or replaced, the data stored in the controller memory may no longer be considered valid. In one approach, the controller determines a position of a switch in the device following start-up, and determines, based on the position of the switch, whether the consumable part contained therein is the same or different. In another approach, the controller determines a status or condition of a conformal diode or resistive film formed along a consumable part following start-up, for example, based on film thickness, changes in a property of the film, etc.

Referring now to FIG. 1, a system 5 is shown. In this non-limiting embodiment, the system 5 is a plasma cutting or welding system including a power source 12 operable to condition raw power and regulate/control the cutting/welding process. The power source 12 may include a controller that, as will be described in further detail herein, receives operational feedback and controls the plasma cutting system 5 accordingly. The power source 12 optionally includes a lifting component, such as a handle 14, which effectuates transportation from one site to another. Connected to the power source 12 is a plasma arc torch 10 via cable 18. The cable 18 provides the plasma arc torch 10 with power and serves as a communications link between the plasma arc torch 10 and the power source 12.

Also connected to power source 12 may be a work clamp 20 which is designed to hold a workpiece (not shown) to be cut and provide a grounding path. Connecting work clamp 20 to the power source 12 is a cable 22 designed to provide a return path for the cutting current from the torch through the workpiece and the work clamp 20. In one non-limiting embodiment, extending from a rear portion of power source 12 is power cable 24 having plug 26 for connecting the power source 12 to a portable power supply 28 or a transmission power receptacle (not shown). Power source 12 further includes an ON/OFF switch 30 to enable a user to initiate shut-down and start-up modes of the of the plasma arc torch 10.

To effectuate cutting or welding of a workpiece, plasma arc torch 10 is placed in close proximity to a workpiece connected to the clamp 20. A user may then activate a trigger (not shown) on the plasma arc torch 10 to deliver power to the plasma arc torch 10 to initiate a pilot arc. Shortly thereafter, a plasma arc is generated and the user may then slowly move the torch across the workpiece to cut or weld the workpiece. In one embodiment, gas is supplied to plasma arc torch 10 from a pressurized gas source 33 or from an internal air compressor.

As used herein, a plasma arc torch includes an apparatus that generates or uses plasma for cutting, welding, spraying, gouging, or marking operations, among others, whether manual or automated. Accordingly, the specific reference to plasma arc cutting torches or plasma arc torches should not be construed as limiting the scope of the present disclosure. Furthermore, the specific reference to providing gas to a plasma arc torch should not be construed as limiting the scope of the present disclosure, such that other fluids, e.g. liquids, may also be provided to the plasma arc torch in accordance with the teachings of the present disclosure.

Figure 2:
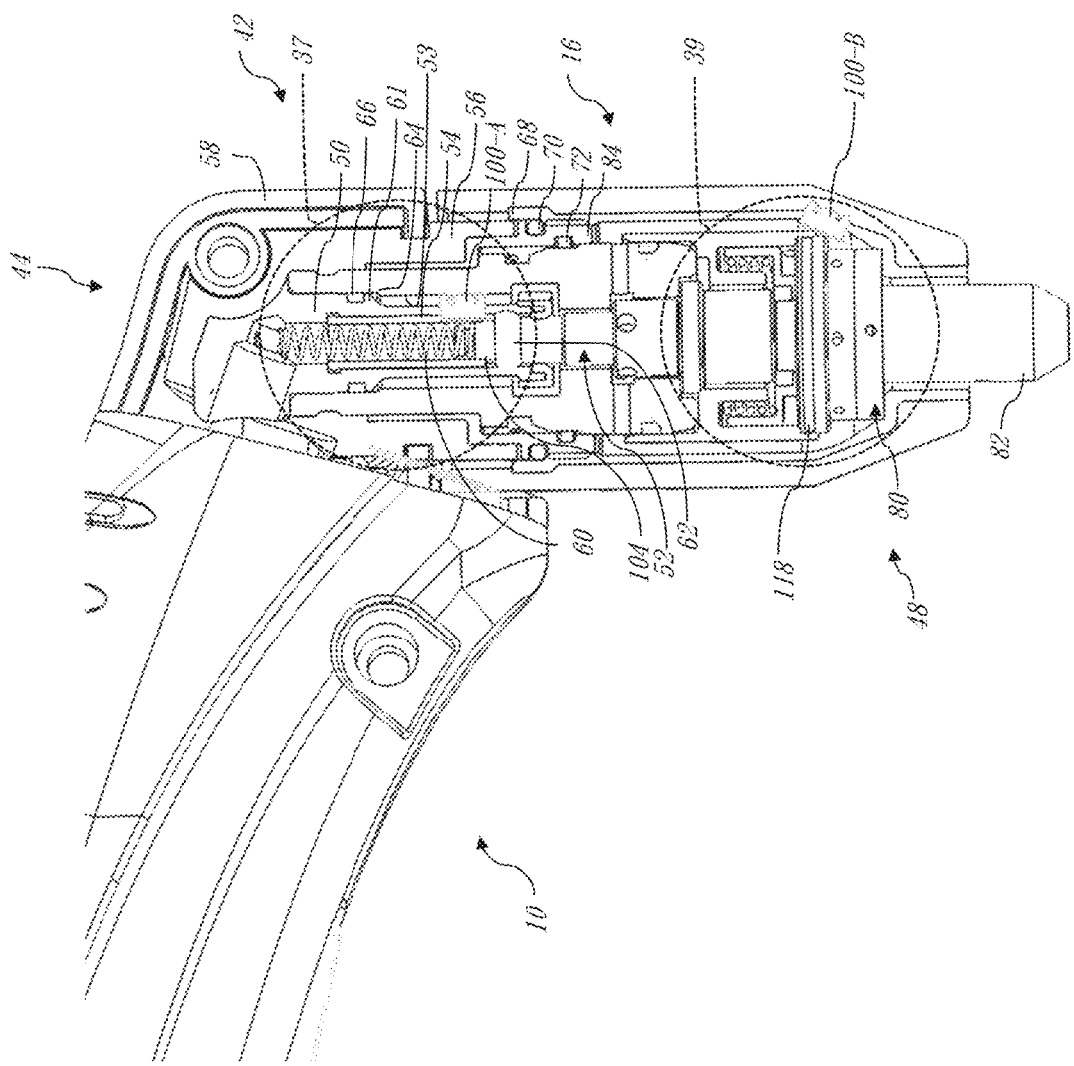
FIG. 2 is an isometric partial cutaway view of the torch handle of FIG. 1 according to an exemplary approach.

Referring now to FIG. 2, the arc torch 10 may include a torch head 42 disposed at a proximal end 44 thereof, and a plurality of consumable parts 16 secured to the torch head 42 and disposed at a distal end 48 of the torch head 42, as shown. The torch head 42 further includes an electrode body 50 that may be in electrical communication with the positive side of a power supply (not shown), and a center electrode 52 that may be in electrical communication with the negative side of the power supply. The center electrode 52 is further surrounded by a central insulator 54 to insulate the center electrode 52 from the electrode body 50 and, similarly, the electrode body 50 is surrounded by an outer insulator 56 to insulate the electrode body 50 from a housing 58, which encapsulates and protects the torch head 42 and its components from the surrounding environment during operation. The center electrode 52 preferably defines a cylindrical tube having a central bore and a spring 60 contained therein.

The electrode body 50 defines a proximal external shoulder 61 that abuts a proximal internal shoulder 64 of the central insulator 54 to position the electrode body 50 along the central longitudinal axis of the torch head 42. Further, the electrode body 50 comprises an external o-ring groove 66 that houses an o-ring to seal the interface between the electrode body 50 and the central insulator 54. Additionally, a distal internal wall 68 of the housing 58 abuts an o-ring 70 disposed within an o-ring groove of the consumable parts 16 to seal an interface between the housing 58 and the consumable parts 16. Additional o-ring grooves 72 with corresponding O-rings (not shown) may be provided between a plurality of interfaces to seal the fluid (e.g., plasma gas, secondary gas, cooling fluid) passageways and are not described in further detail herein for purposes of brevity.

In one embodiment, electrical continuity for a pilot return or other electrical signals may be provided directly through an interface between a torch cap and the electrode body 50 using detents engaging a shoulder. The detents may be incorporated on the torch cap or the electrode body 50 with a corresponding shoulder and cap on the electrode body 50 or torch cap, respectively. Further, the detents provide a connection that is relatively simple and easy to engage and disengage. Similarly, other components within the plasma arc torch 10 may also employ detents and shoulders for respective connections.

As further shown, the consumable parts 16 may include an electrode 80, an electrode tip 82, and a cartridge body 84, which generally houses and positions the consumable parts 16. In some embodiments, the cartridge body 84 also distributes plasma gas, secondary gas, and cooling fluid during operation of the plasma arc torch 10. Additionally, the connection between the cartridge body 84 and the center electrode 52 may employ the detents and shoulders, as previously described above. In addition to positioning the various consumable parts 16, the cartridge body 84 may also separate the electrode body 50 from cathodic members. Accordingly, the cartridge body 84 may be an insulative material such as PEEK® or other similar material capable of operating at relatively high temperatures.

Referring now to FIGS. 2-4, a structure and operation of one or more indicators within the plasma arc torch 10 will be described in greater detail. In exemplary embodiments, a switch may be used to detect consumable part changes when the welding or cutting system is deenergized. In one possible solution, an electrical switch may be opened and closed for two disparate mechanical conditions. For example, computer memory and other elements of electrical circuitry are based around a "flip-flop" concept. Producible in multiple functional forms, and with various transistor topologies, latches capture transient binary electrical states, retaining a logical high or low level even after the input conditions have passed.

More specifically, in one embodiment, the switch represents an electromechanical switch that may be set the first time the torch gas line is pressurized, e.g., by the gas source 33 (FIG. 1) and reset whenever the consumable part 16 is disassembled. As such, if the switch is observed in an open position, it may indicate that one or more of the consumable parts 16 operable with the switch was removed or replaced while the plasma arc torch 10 was deenergized. Conversely, if the switch is closed when the machine is energized, it may indicate that the part(s) currently in place have been used previously. In such case, the controller of the plasma arc torch 10 may continue compiling data along with previously observed historical data, including information recorded during prior power cycles with respect to one or more of the consumable parts 16.

In one non-limiting embodiment, the switch represents a reed switch 100-A in which steel or another ferromagnetic material may be embedded or attached in an area proximate the cathode 62, as shown in FIGS. 2-3. Pressure within the plasma arc torch 10 blows the magnet to steel connection, while a magnetic force keeps the material in place relative to the cathode 62 under normal conditions. In one embodiment, the reed switch 100-A may be embedded or attached to a sidewall 53 of the central insulator 54, proximate the cathode 62. The reed switch 100-A operates with a magnetic element 104, which is attached to a spring 60, whereby compression/decompression of the spring 60 actuates the magnetic element 104 relative to the cathode 62.

Figure 3A:
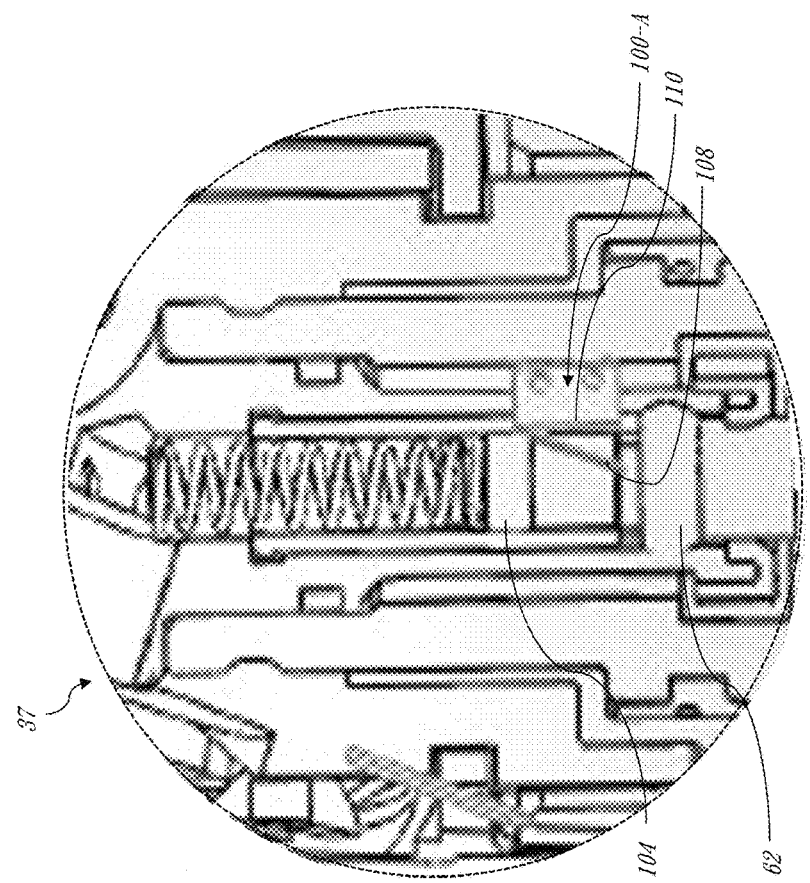
FIGS. 3A-B are side cutaway views of an electromechanical indicator according to an exemplary approach.
Figure 3B:
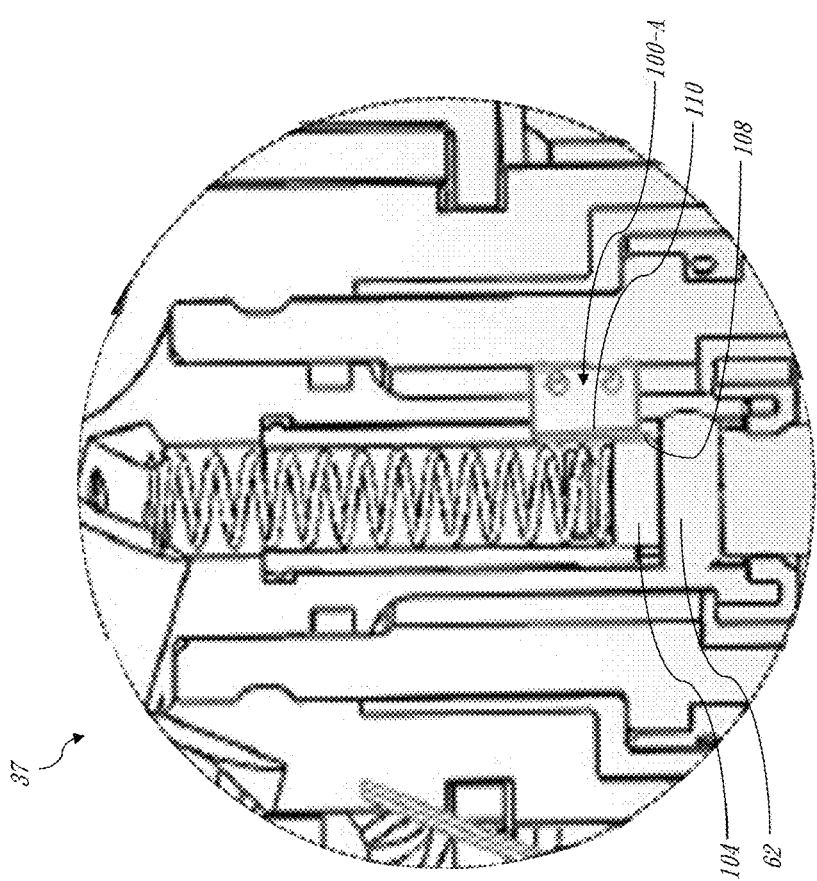

Referring now to FIGS. 3A-B, operation of the reed switch 100-A will be described in greater detail. During operation, the torch gas line is initially pressurized, which causes the spring 60 to compress and actuate the magnetic element 104 towards the cathode 62. The magnetic element 104 attaches to the cathode 62, for example as shown in FIG. 3A, where it remains until removal or replacement of one or more parts of the consumable part 16 breaks the magnetic connection therebetween. As shown, when the magnetic element 104 is coupled to the cathode 62, a first contact element 108 of the reed switch 100-A is actuated towards a second contact element 110, thus forming a closed circuit when connection is made. Breaking the magnetic connection between the magnetic element 104 and the cathode 62 actuates the magnetic element 104 away from the cathode 62, which allows the first contact element 108 of the reed switch 100-A to move away from the second contact element 110, for example as shown in FIG. 3B. The reed switch 100-A remains in an open position until it is reset.

Figure 4B:
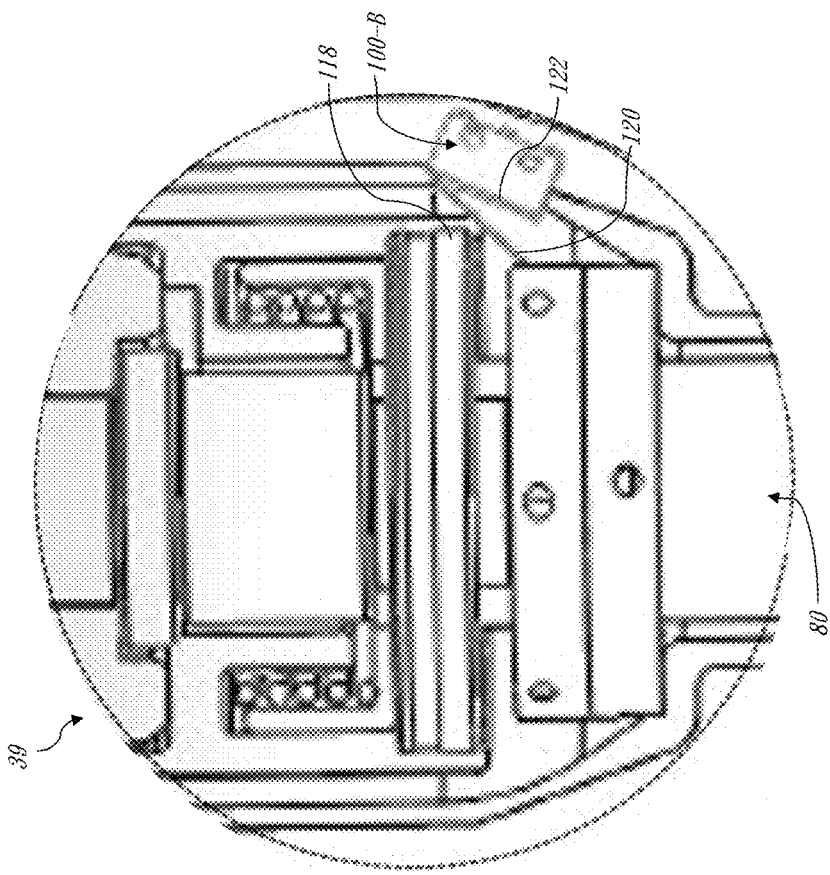
FIGS. 4A-B are side cutaway views of an electromechanical indicator according to an exemplary approach.
Figure 4A:
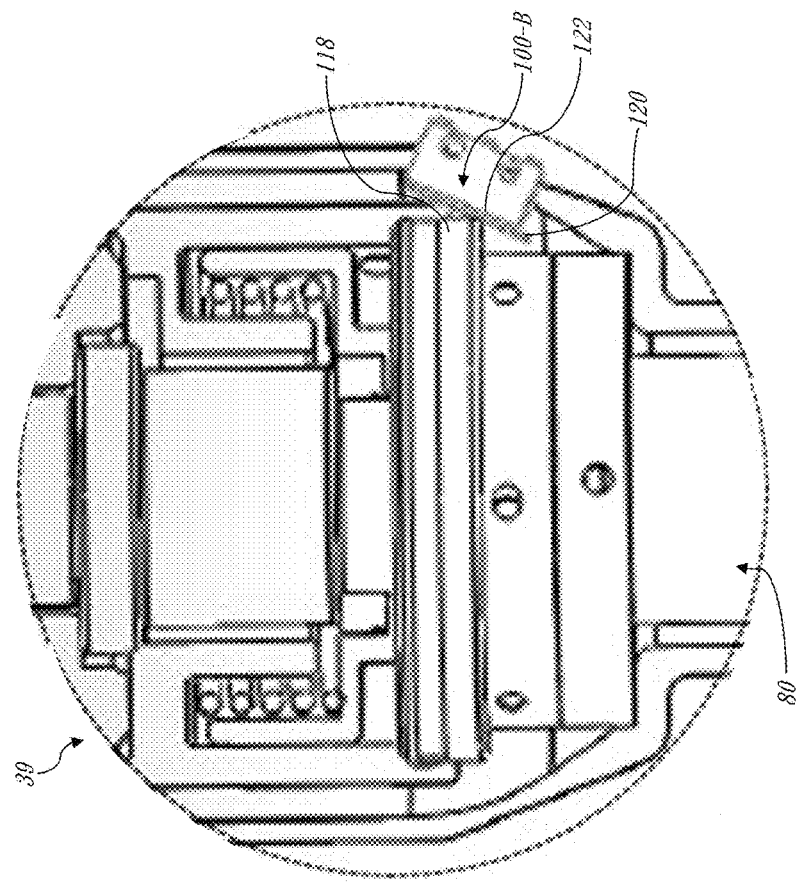

In another non-limiting embodiment, as shown in FIGS. 4A-B, a reed switch 100-B may additionally or alternatively be disposed within the plasma arc torch 10 in an area proximate the electrode 80. In this case, the reed switch 100-B may be embedded or attached to an inner surface of an exterior wall 114, proximate a flange 118 of the electrode 80. During operation, a downward force applied by the flange 118 to the reed switch 100-B in a direction toward the distal end 48 of the torch head 42 maintains a connection between a first contact element 120 and a second contact element 122 of the reed switch 100-B, as shown in FIG. 4A. The reed switch 100-B remains in a closed position until the electrode tip 82 and or the electrode 80 are removed or replaced, which alleviates the force applied by the flange 118, thus allowing the first contact element 120 of the reed switch 100-B to move away from the second contact element 122, for example as shown in FIG. 4B. In one embodiment, the reed switch 100-B is normally open, and the reed switch 100-B remains in an open position until a new tip and/or electrode is inserted into the consumable part 16 and the switch 100-B is reset.

Referring now to FIGS. 5A-B, a cutaway view of a distal end portion 150 of a plasma arc torch head 152 is shown. In exemplary embodiments, one or more consumable components are coated with a conformal film 144 to detect consumable part changes. For example, as will be described in greater detail below, a distal end 140 of an electrode 142 may have a conformal film 144 formed thereon for the purpose of indicating whether the electrode 142 has been removed or is a replacement electrode included within the welding/cutting system, or is an existing electrode used in previous power cycles.

As shown in this non-limiting embodiment, the plasma arc torch head 152 includes a cathode 154 in electrical communication with the negative side of a power supply (not shown). The cathode 154 defines an inner conduit 156 having a proximal end portion in fluid communication with a coolant supply via a coolant supply tube (not shown). The inner conduit 156 may also include a distal end portion in fluid communication with a sleeve 158. The consumable components of the plasma arc torch head 152 may include the electrode 142 and a nozzle 166. In exemplary embodiments, the nozzle 166 is configured to direct a high velocity stream of plasma gas towards a work piece (not shown) that is to be cut, marked, or welded. The consumable components further include a central body 168 and spacers 170 separating the nozzle 166 from a shield cap 172.

When mounted in the plasma arc torch head 152, the electrode 142 is centrally disposed within the central body 168 and in electrical communication with the cathode 154. Further, the central body 168 surrounds both the electrode 142 and a central insulator (not shown). In one embodiment, the central body 168 separates an anode shield from the electrode 142 and the tip 162. The central body 168 may be an electrically insulative material such as PEEK®, although other electrically insulative materials can also be used.

In one non-limiting embodiment, the electrode 142 may be made of an erodible material, such as copper, a copper alloy, silver, or a silver alloy. Furthermore, the electrode 142 may define a bore 174 at the distal end 140 of the electrode, the bore 174 configured in some embodiments to receive an emissive element 176, which may be made of an erodible material, such as hafnium, a hafnium alloy, zirconium, a zirconium alloy, or other material known in the art and having suitable characteristic. In some cases, the emissive element 176 may be in the form of a circular rod, which is press fit, brazed, or otherwise embedded into the bore 174 of the electrode 142. The emissive element 176 may be concentrically disposed.

An electrode holder (not shown) may be arranged within the central body 168 such that the electrode holder is axially movable relative to the plasma arc torch head 152. The electrode 142 can be releasably attached to the electrode holder such that the electrode projects from the electrode holder in a forward direction (i.e., in the direction of the operational end of the plasma art torch head 152) towards an opposing surface of the nozzle 166. Thus, when the electrode 142 is attached to the electrode holder, axial movement of the electrode holder causes the electrode 142 to move towards or away from the operational end of the plasma arc torch head 152.

In this regard, prior to the start of a torch operation, the electrode 142 may be biased towards the nozzle 166, for example by a spring (not shown), such that the electrode 142 is in an extended position. In the extended position (shown in FIG. 5A), the end face of the electrode 142 makes electrical contact with the opposing surface of the nozzle 166 via the conformal film 144. Upon actuation of a trigger (not shown), the power source 12 (FIG. 1) can be used to apply a voltage differential between the electrode 142 and the nozzle 166, causing closing of a circuit and current to flow therebetween. At substantially the same time, a plasma gas, such as air, is allowed to flow through a passageway, where the force of the gas overcomes the bias of the electrode holder and moves the electrode 142 away from the nozzle 166, thus creating the arc.

In exemplary embodiments, the conformal film 144 is a sacrificial material including a coat or layer of conductive, semiconducting, or nonconductive materials such as silicon, wax, or tin, each of which is configured to diminish or erode at a pre-specified temperature. In one embodiment, the conformal film 144 may be formed on the electrode 142 using any one of the following techniques such as plating, chemical bathing, screen printing, film transfer, paint, spray, ink pad, or vapor deposition. In another embodiment, the conformal film 144 may include a substance having a consistent characteristic impedance, such as a paint or ink developed with consistent properties. In other embodiments, a phenolic resin with a metal filler applied to a consistent thickness could also be employed.

During operation, to indicate consumable part changes occurring when plasma arc torch head 152 is deenergized, each new electrode (e.g., the electrode 142) is coated with the conformal film 144 and inserted within the central body 168, as shown in FIG. 5A. As configured, the conformal film 144 functions as an indicator that electrically connects the electrode 142 and the nozzle 166 when present. Alternatively, in another embodiment, the conformal film 144 may be applied to the nozzle 166, wherein an electrical connection is formed between the nozzle 166 and the shield cap 172.

As an arc is created in the plasma arc torch head 152, heat and/or electrical current transmitted between the electrode 142 and the nozzle 166 causes the conformal film 144 to degrade (e.g., melt), which reduces its thickness, changes one or more film properties, or eliminates the conformal film 144 entirely, for example, as shown in FIG. 5B. Once the sacrificial film is removed or reduced to the point where contact is no longer made between the electrode 142 and the nozzle 166, the circuit formed therebetween is in an open position.

In one embodiment, data corresponding to the conformal film 144 is used to determine whether the electrode has been previously used. For example, a replacement consumable part may be present within the torch head following the start-up of the plasma arc torch in the case that an electrical measurement (e.g., impedance or current) of the conformal film 144 and a reference electrical measurement value are substantially equal. Conversely, it may be determined that the consumable part is present within the torch head following the start-up of the plasma arc torch in the case that the electrical measurement of the conformal film and the reference electrical measurement value are substantially unequal.

As further demonstrated in FIGS. 6A-C, the conformal film 144 initially produces a current (I) of 10A or greater, which changes as the conformal film 144 burns away. In the case that the conformal film 144 is a diode like film that breaks down or vaporizes after the first arc is applied, the initial electrode positive current shown in FIG. 6A to the nozzle is blocked, thus causing a current (I) output in which only electrode negative current to flow, as shown in FIG. 6B. This resultant output 147 then provided to the controller to determine that the present electrode is used.

During each subsequent power-up, a low power AC is run through the torch and, if a current (I) output similar to AC is generated through the diode film, as shown in the reference electrical measurement value 149 of FIG. 6C, then the controller may determine that a new electrode is present. However, if the output does not function like AC, and instead more closely resembles the output signal 147 shown in FIG. 6B, then the controller may determine that the present electrode has been used in previous power cycles.

In another embodiment, an impedance of the electrode 142 is measured to determine whether the electrode 142 has been previously used. That is, should a different (e.g., new) electrode, which is coated with the conformal film 144, be subsequently inserted within the central body 168, it will register as "new" based on a difference in observed impedance or current. Each replacement electrode can be discerned when the machine was reenergized so that parts automatically register as being previously used.

For example, as demonstrated in FIGS. 7A-C, the conformal film 144 initially corresponds to a high impedance (Z), such as 200 ohms (1A), which diminishes as the conformal film 144 diminishes. In the case that a resistive like film (e.g., a paraffin wax) is included on the distal end of the electrode 142 in contact with the nozzle 166, the impedance level is reduced from the level shown in FIG. 7A, to the impedance output 151 shown in FIG. 7B, as the conformal film 144 vaporizes in response to the arc.

During each subsequent power-up, a low power AC is run through the plasma arc torch 10 and, in the case that the impedance observed through the resistive film is equal to or substantially equal to a reference electrical measurement value 153 (e.g., impedance) of FIG. 7C, then the controller may determine that a new electrode is present. However, if the output signal more closely resembles the impedance output 151 shown in FIG. 7B, then the controller may determine that the present electrode has been used in previous power cycles.

Figure 8:
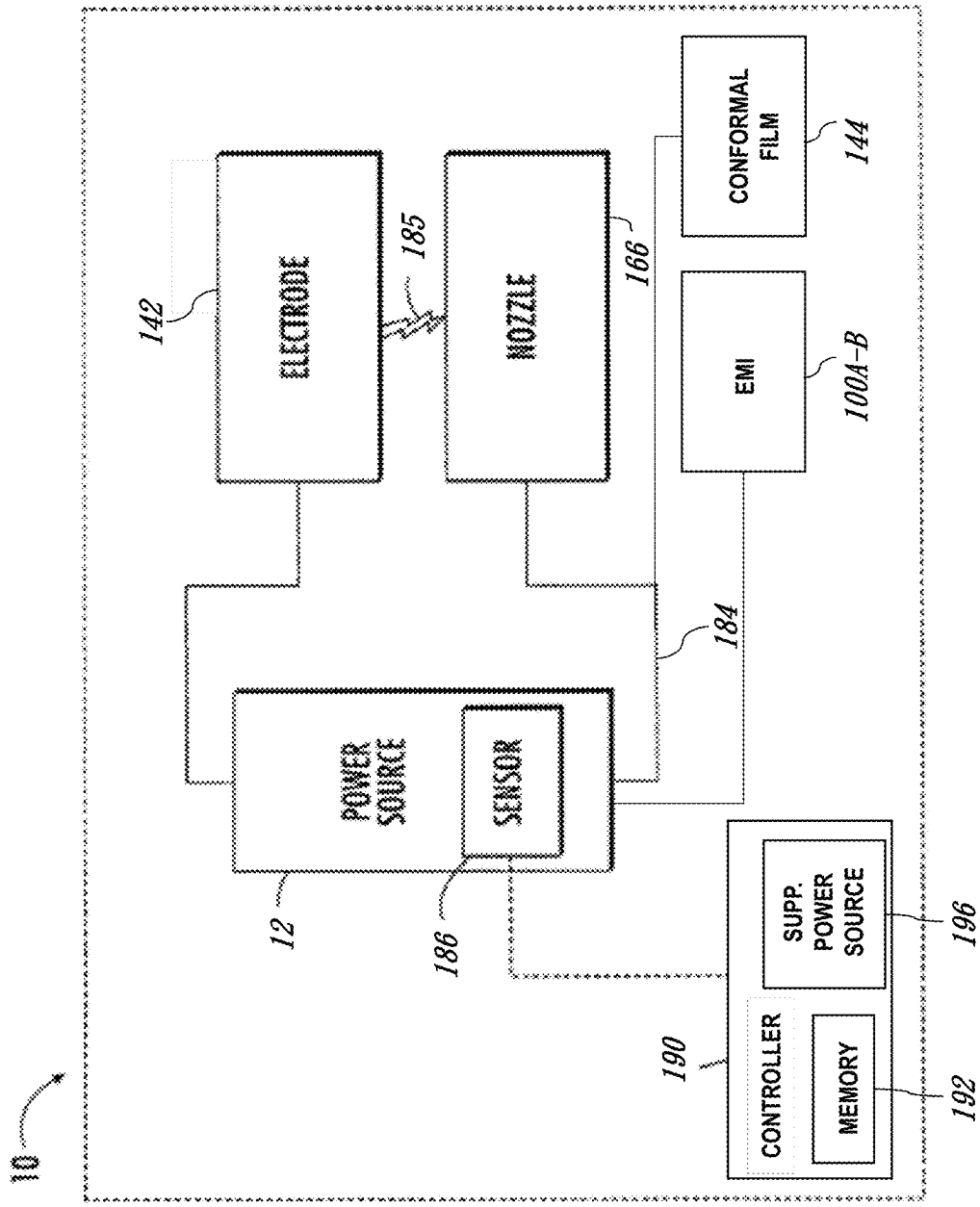
FIG. 8 shows a schematic of an exemplary system in accordance with certain aspects of the present disclosure.

Referring now to FIG. 8, operation of a controller of the plasma arc torch 10 according to exemplary embodiments will be described in greater detail. As shown, the plasma arc torch 10 includes the power source 12 that is electrically connected to the electrode 142. The power source 12 may be configured to apply a voltage differential between the electrode 142 and the nozzle 166 to initiate the pilot arc when the electrode 142 is in electrical contact with the nozzle 166, as described above. That is, when the end face of the electrode 142 is in contact with the opposing surface of the nozzle 166, an electrical circuit 184 is completed, and the application of a voltage differential between the electrode 142 and the nozzle 166 causes an electrical current 185 to flow between the two conductors. Thus, as the electrode 142 is moved away from the nozzle 166, the current flow establishes the pilot arc across the gap formed between the two conductors.

In some embodiments, the plasma arc torch 10 may further include a sensor 186 configured to detect a state of the electrical circuit 184 defined between the electrode 142 and the nozzle 166 when the voltage differential is applied. The sensor 186 may be included on or within the power source 12, as shown in FIG. 8. In one embodiment, the sensor 186 may be physically separate and distinct from the power source 12, but may be in communication with the power source 12 or another portion of the circuit 184. In yet another embodiment, embodiment, a supplemental power source 196, such as a battery, capacitor or other energy storage device, could be used by the sensor 186 and the electrical circuit 184 when the plasma arc torch 10 is not receiving power from the power source 12.

In this way, the sensor 186 may detect the electrical state of the circuit 184 defined by the power source 12, the electrode 142, the nozzle 166, and/or the conformal film 144. For example, when the voltage differential is applied to the circuit 184 and current is flowing, the sensor 186 may detect a complete circuit. On the other hand, if a voltage differential is applied to the electrode 142 and the nozzle 166 but there is no current flow, the sensor 186 may detect a state of electrical discontinuity between the sensor 186 and the nozzle 166 and/or other portions of the electrical circuit 184.

As shown, the plasma arc torch 10 further includes a controller 190 in communication with the power source 12, the electrode 142, the nozzle 166, and the switch 100A-B. As described above, the controller 190 receives historical data from various components of the plasma arc torch 10 to adjust cut or weld parameters based on trends detected during earlier operation, or to generate a prompt an operator that service is required before substandard performance compromises the work. Patterns, anomalies, and trends are stored within memory 192 and analyzed by the controller 190.

In some embodiments, the controller 190 is operable to associate a first set of performance data with the consumable part, determine a position of the EMI following start-up of the plasma device, determine, based on the position of the EMI, whether the consumable part is present within the plasma device following start-up of the plasma device, associate a second set of performance data with the consumable part in the case that the consumable part is determined to be present within the plasma device following start-up of the plasma device.

The controller 190 may further be used to compensate outputs or to issue warnings before the symptoms compromise the work piece and/or other cutter and welder components. Changes to consumable parts and the indicator(s) coupled thereto, may be detectable by one or more sensors (e.g., sensor 186) as measurements change in magnitude, frequency or duration. Output data may be subsequently relayed to operators or technical service representatives for fault diagnosis or to signal the need for preventive maintenance.

Additionally, the controller 190 may receive cumulative arc time, number of starts/stops, and other factors correlated to wear, such as cut current or the mean and standard deviation of GMA weld current for a given voltage and wire feed speed setting, that may be used to augment end-of-life detection. Such process durations and counts might also be used alone, e.g., without sensor inputs, to estimate when parts may have degraded excessively. The information may also be useful to assess the techniques of individual workers or to determine when consumable wear may cause imminent failure.

In some embodiments, the electrical circuit 184 of the plasma arc torch 10 may be inactive (e.g., while powered-down) and, as a result, the sensor 186 and circuitry cannot detect changes as they are made to parts-in-place or any other monitored conditions that would indicate that the controller 190 should disregard, bundle or reset certain types of nonvolatile data as the plasma arc torch 10 is reactivated. To accomplish this, the controller 190 uses the position of the switch 100A-B or condition of the conformal film 144 in the plasma arc torch 10 during start-up to determine whether the consumable part is likely a replacement, or whether the consumable part is likely to have been used during previous power cycles. In some embodiments, this approach may extend process knowledge from a single cut cycle to long-term performance tracking, including knowledge of part changes and other user intervention during "blackouts" when the plasma arc torch 10 may be inactive.

Furthermore, in the case that the conformal film 144 is present within the plasma arc torch 10, the controller 190 receives data corresponding to the conformal film 144 is used to determine whether the electrode 142 has been previously used. That is, both prior to and following start-up of the plasma arc torch 10, the controller 190 receives voltage, current, and/or impedance values corresponding to the conformal film 144. Known, baseline measurements for consumable parts are compared to measurements taken upon start-up of the plasma arc torch 10 to determine whether the present electrode has been used in previous power cycles.

In an alternate or complementary embodiment, a battery, capacitor or other energy storage device could be used to power circuits to detect changes to the parts-in-place or other electrical switches mechanically coupled to consumable assemblies. For example, the controller 190 may include the supplemental power source 196 (e.g., a battery) that maintains a clock or a count of the switch 100A-B opening while power is off. A count greater than one may be interpreted as a consumable change.

In some embodiments, the controller 190 may be an expert system in the plasma arc torch 10 or in a remote computer. The controller 190 may include a processing component for processing or performing logic operations for one or more components of the plasma arc torch 10. The processing component may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software components, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some embodiments, the processing component may include common computing elements, such as multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

Figure 9:
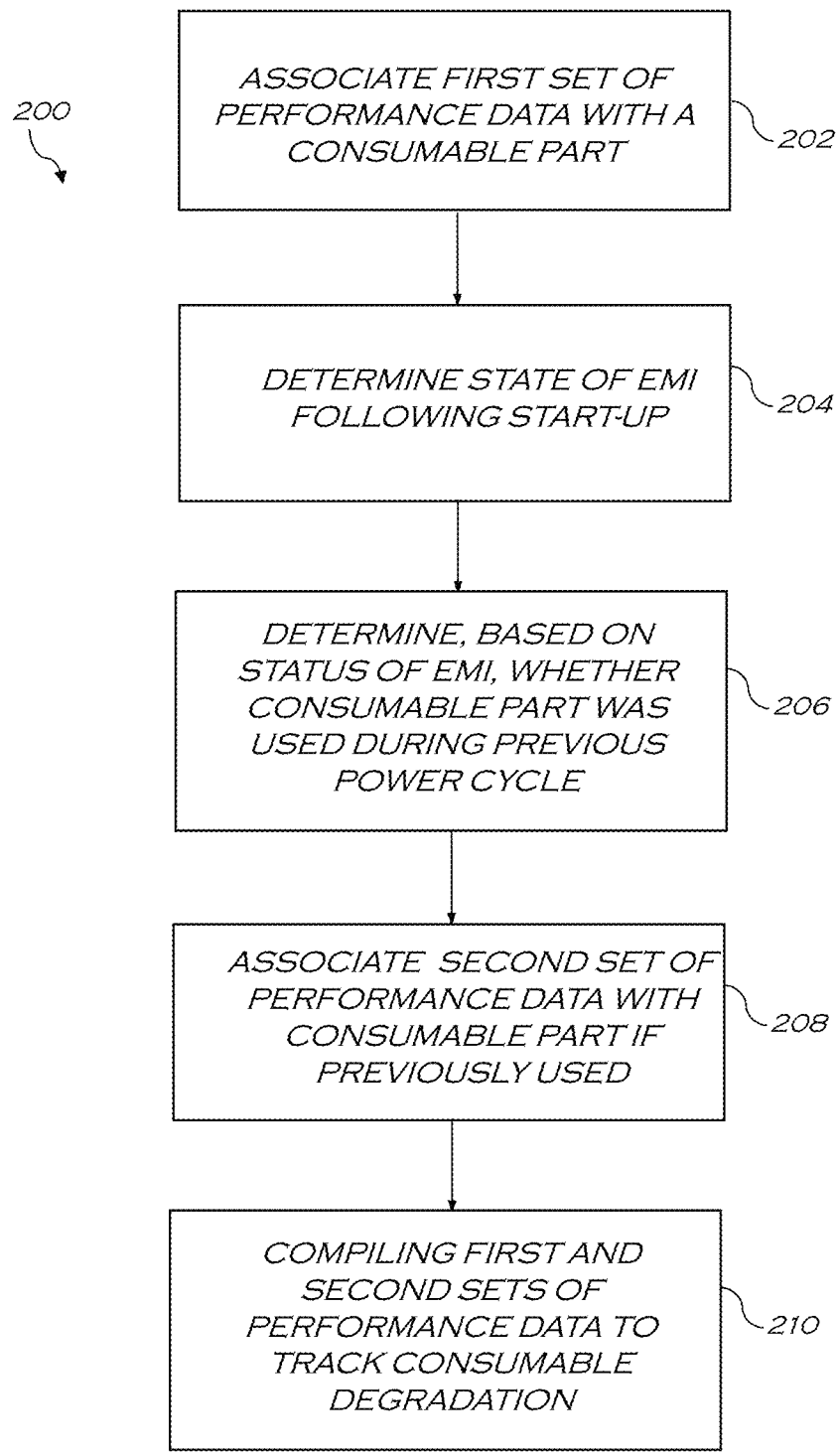
FIG. 9 is a flowchart illustrating an exemplary process according to the present disclosure.

Referring now to FIG. 9, a method 200 for detecting replacement of a consumable of plasma torch according to exemplary embodiments will be described in greater detail. Method 200 includes associating a first set of performance data with a consumable part of a plasma device, as shown at block 202. In one embodiment, the performance data may include, for example, the average tip voltage for a preset cut current output, or the mean and standard deviation of GMA weld current for a given voltage and wire feed speed setting. In one embodiment, the performance data may be stored in memory of a controller. In one embodiment, the consumable parts include electrodes, tips, nozzles, liners, rollers and wire guides.

The method 200 may further include determining a state of an EMI coupled to the consumable part following start-up of the plasma device, as shown at block 204. In one embodiment, the EMI indicates one of two different states (e.g., connected or disconnected).

The method 200 may further include determining, based on the state of the EMI, whether the consumable part was used during a previous power cycle, as shown at block 206. In one embodiment, it is determined that the consumable part was removed prior to the start-up of the plasma device in the case that the EMI is determined to be in an open position.

The method 200 may further include associating a second set of performance data with the consumable part in the case that the consumable is determined as being used during the previous power cycle, as shown at block 208. In one embodiment, the second set of performance data is associated with a second consumable part in the case that the consumable part is determined, following start-up of the plasma device, as not being used during the previous power cycle.

The method 200 may further include compiling the first set of performance data with the second set of performance data to track degradation of the consumable part, as shown at block 210.

The method 200 advantageously indicates that the consumable part(s) may have been changed while the plasma cutter was deenergized. Specifically, if the switch was closed when the machine was energized, it is likely that the consumable part(s) are used previously. The cutter or welder could continue using historical data, including data recorded during prior power cycles. The method 200 provides a technique for knowing if certain types data stored in the controller's nonvolatile memory are still valid. This may further extend process knowledge from a single cut cycle to long-term performance tracking, including knowledge of consumable part changes and other user intervention during periods were the machine is de-energized.

Figure 10:
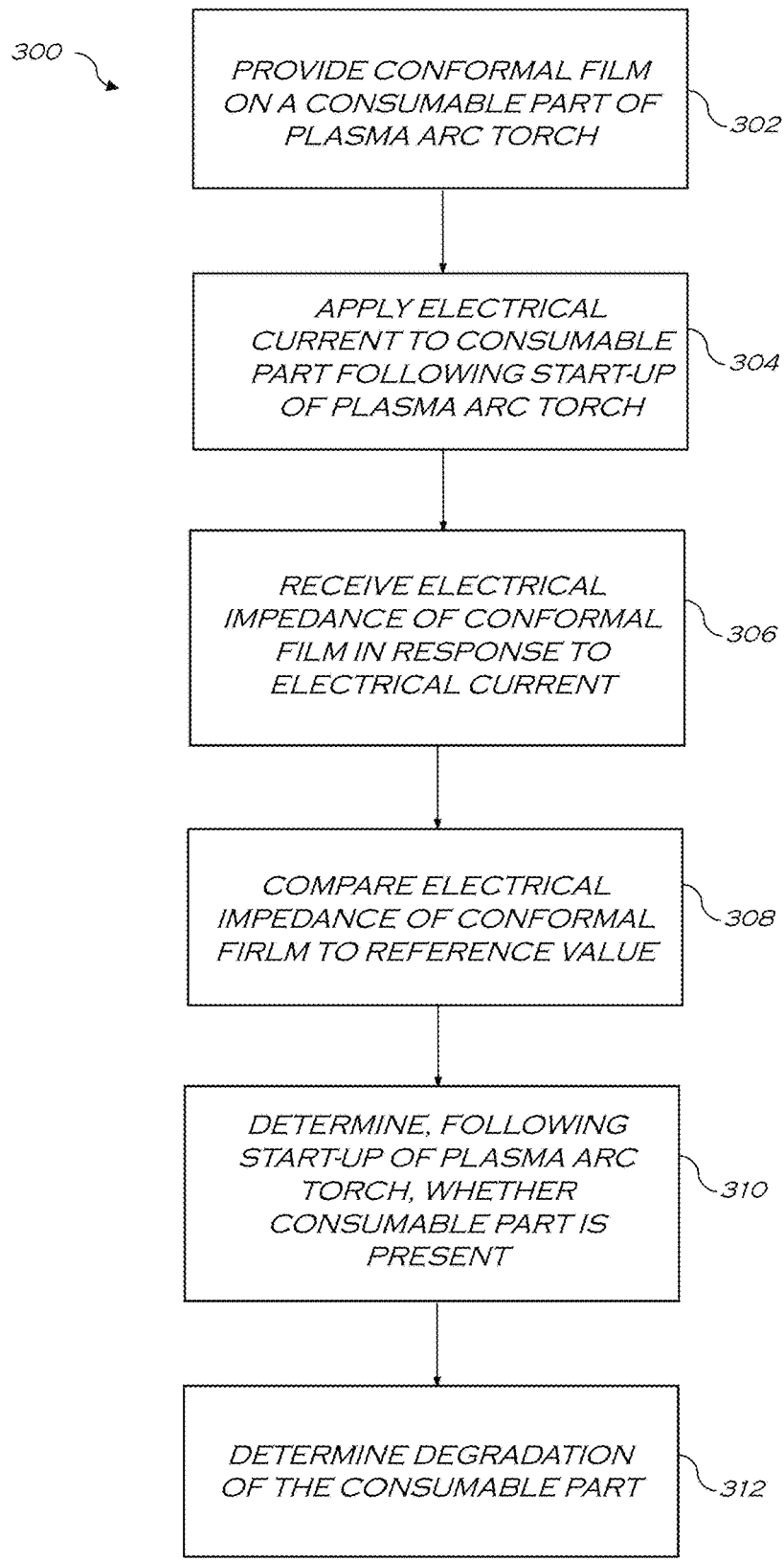
FIG. 10 is a flowchart illustrating an exemplary process according to the present disclosure.

Referring now to FIG. 10, a method 300 for detecting replacement of a consumable of plasma torch according to exemplary embodiments will be described in greater detail. The method 300 may include providing a conformal film on a consumable part of a plasma arc torch, as shown at block 302. In one embodiment, the plasma arc torch is a plasma welder or plasma cutter. In one embodiment, the consumable part is an electrode. In one embodiment, the conformal film may be a diode film or a resistive film made from a conductive material, a semiconducting material, or a nonconductive material.

The method 300 may further include applying an electrical current to the consumable part following a start-up of the plasma arc torch, as shown at block 304.

The method 300 may further include receiving an electrical impedance of the conformal film in response to the electrical current, as shown at block 306.

The method 300 may further include comparing the electrical impedance of the conformal film to a reference conformal film impedance value, as shown at block 308. The reference conformal film impedance value may be retrieved from memory of a controller.

The method 300 may further include determining, following the start-up of the plasma arc torch, whether the consumable part is present within the plasma arc torch based on the comparison of the electrical impedance of the conformal film and the reference conformal film impedance value, as shown at block 310. In one embodiment, the method includes determining that a replacement consumable part is present within the torch head following the start-up of the plasma arc torch in the case that the electrical impedance of the conformal film and the reference impedance value are substantially equal. In one embodiment, the method includes determining that the consumable part is present within the torch head following the start-up of the plasma arc torch in the case that the electrical impedance of the conformal film and the reference impedance value are substantially unequal.

The method 300 may further include determining degradation of the consumable part, as shown at block 312. In one embodiment, the first set of performance data, obtained prior to torch shut-down, is combined with a second set of performance data, obtained after torch start-up. In one embodiment, the second set of performance data is associated with the consumable part in the case that the consumable is determined as being used during the previous power cycle. In one embodiment, the second set of performance data is associated with a second consumable part in the case that the consumable part is determined, following start-up of the plasma device, to be unused.

While the present disclosure has been described with reference to certain approaches, numerous modifications, alterations and changes to the described approaches are possible without departing from the sphere and scope of the present disclosure, as defined in the appended claims. Accordingly, it is intended that the present disclosure not be limited to the described approaches, but that it has the full scope defined by the language of the following claims, and equivalents thereof. While the disclosure has been described with reference to certain approaches, numerous modifications, alterations and changes to the described approaches are possible without departing from the spirit and scope of the disclosure, as defined in the appended claims. Accordingly, it is intended that the present disclosure not be limited to the described approaches, but that it has the full scope defined by the language of the following claims, and equivalents thereof.

What is claimed is:

1. An apparatus comprising:
   a conformal film disposed on a consumable part of a plasma device, the conformal film closing a circuit for conducting an electric current between the consumable part and another consumable part when present on the consumable part and opening the circuit to stop conducting the electric current once diminished through use of the consumable part; and
   a controller in communication with the consumable part and the conformal film, the controller operable to:
   receive a first set of performance data associated with the consumable part;
   determine a condition of the conformal film following a start-up of the plasma device based on whether the electric current is being conducted;
   determine, based on the condition of the conformal film, whether the consumable part has been replaced following the start-up of the plasma device;
   receive a second set of performance data associated with the consumable part; and
   compile the first set of performance data with the second set of performance data to track degradation of the consumable part in response to determining the consumable part has not been replaced.

2. The apparatus of claim 1, wherein the consumable part is an electrode.

3. The apparatus of claim 1, wherein the conformal film is a sacrificial film formed on the consumable part.

4. The apparatus of claim 1, wherein the another consumable part is a nozzle of the plasma device.

5. The apparatus of claim 1, wherein the conformal film is one of: a layer of conductive material, a layer of semiconducting material, and a layer of a nonconductive material.

6. The apparatus of claim 1, wherein the consumable part is an electrode tip.

7. The apparatus of claim 6, wherein the conformal film is disposed along a distal end surface of the electrode tip.

8. The apparatus of claim 1, wherein the consumable part is a nozzle.

9. A method comprising:
   providing a conformal film on a consumable part of a plasma arc torch, the conformal film closing a circuit between the consumable part and another consumable part when present on the consumable part and opening the circuit once the conformal film is diminished through use of the consumable part;
   applying an electrical current to the consumable part following a start-up of the plasma arc torch;
   receiving an electrical measurement of the conformal film in response to the electrical current; and
   determining, following the start-up of the plasma arc torch, whether the consumable part has been replaced by comparing the electrical measurement of the conformal film to a reference electrical measurement value.

10. The method according to claim 9, further comprising:
    determining that a replacement consumable part is present within the plasma arc torch following a second start-up of the plasma arc torch when the electrical measurement of the conformal film and the reference electrical measurement value are substantially equal, the second start-up being subsequent a shut-down of the plasma arc torch after the start-up.

11. The method according to claim 9, further comprising determining that the consumable part has not been replaced following a second start-up of the plasma arc torch when the electrical measurement of the conformal film and the reference electrical measurement value are substantially unequal, the second start-up being subsequent a shut-down of the plasma arc torch after the start-up.

12. The method according to claim 9, further comprising:
    obtaining a first set of performance data during a power cycle prior to the start-up of the plasma arc torch; and
    associating the first set of performance data with the consumable part.

13. The method of claim 12, further comprising storing the first set of performance data of the consumable part prior to a shut-down of the plasma arc torch.

14. The method according to claim 12, further comprising associating a second set of performance data with the consumable part when the consumable part is determined to be not replaced following a second start-up of the plasma arc torch, the second start-up being subsequent a shut-down of the plasma arc torch after the start-up of the plasma arc torch.

15. The method according to claim 14, further comprising:
  compiling the first set of performance data with the second set of performance data; and
  determining degradation of the consumable part based on the first set of performance data and the second set of performance data.

16. A plasma arc torch comprising:
a torch head disposed at a proximal end of the plasma arc torch;
a conformal film disposed on an electrode within the torch head, the conformal film electrically coupling the electrode to another consumable part when present on the electrode and electrically decouple the electrode from said another consumable part once diminished through use of the electrode; and
a controller for receiving a measurement from the conformal film, the controller operable to determine, based on the measurement from the conformal film, whether the electrode was used in a previous power cycle prior to a shutdown of the plasma arc torch.

17. The plasma arc torch of claim 16, wherein the conformal film is a sacrificial film formed on the electrode, and wherein the another consumable part is a nozzle so that the electrode is capable of electrically coupling to the nozzle.

* * * * *